UNITED STATES PATENT OFFICE.

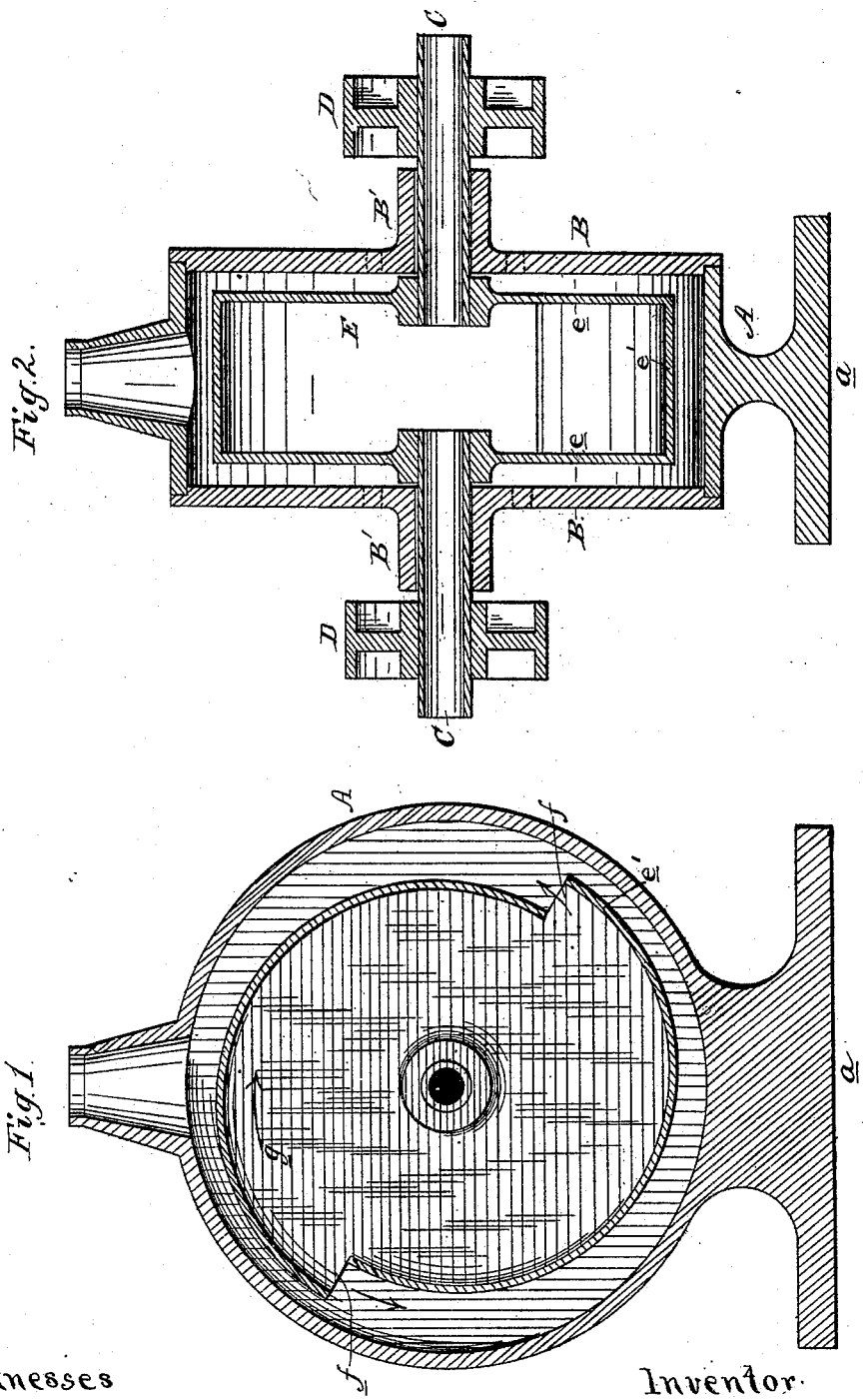

WILLIAM S. SHARPNECK, OF BLAIR, NEBRASKA, ASSIGNOR OF ONE-HALF TO GREEN MAJORS, OF SAME PLACE.

BLOWER.

SPECIFICATION forming part of Letters Patent No. 271,139, dated January 23, 1883.

Application filed April 12, 1882. (No model.)

*To all whom it may concern:*

Be it known that I, WILLIAM S. SHARPNECK, a citizen of the United States, residing at Blair, in the county of Washington and State of Nebraska, have invented certain new and useful Improvements in Blowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of blowers in which the air is taken in at the center of a revolving shell and then passed out of said shell through apertures at the outer edge thereof; and the invention consists in the peculiar construction and arrangement of parts hereinafter more fully described and claimed.

In the accompanying drawings, Figure 1 shows a vertical section through the center of Fig. 2, which is a section through the center of Fig. 1.

A represents the case, provided with a suitable base, a, and heads B, one of which heads may be cast solid with the rim of the case; or they may both be cast separate and bolted to the case or secured thereto in any suitable way. These heads are provided with boxes, B', in which are fitted hollow shafts C, each of which is preferably provided with a band-pulley, D, although the blower may be driven with one pulley, if desired. Attached to these shafts is a shell, E, formed of two plates, e, of the form shown in Fig. 1, and connected together by rims e', which are so connected to the plates e as to leave openings, f, at the periphery of the shell. This shell may be made of sheet metal or may be cast, as preferred by the manufacturer.

The operation is as follows: Motion being given to the shell in the direction shown by arrow g by means of a band or bands from any suitable motive power, passing around the pulley or pulleys D, the shell is rapidly revolved and air is drawn into it at the center through the hollow shafts and passes out at the apertures, as shown by the arrows.

By this construction a very powerful blower is produced, as, in addition to the effect of centrifugal force in driving the air out of the case, the peculiar form of the outer edge of the shell forces the air through the outlet, thus creating a vacuum behind the apertures in the shell, through which air rapidly passes into the case, to be again forced out by the cam-shaped edge of the shell as it revolves.

The use of hollow shafts and the admission of air through them tends to keep the bearings cool, no matter how rapidly the blower may be driven, and by using two shafts with air admitted through both the pressure of the air is evenly balanced, and thus all end-pressure on the bearings is avoided.

If preferred, apertures may be made near the center of the case, as shown in dotted lines in Fig. 2, and air may be drawn in at those points also, as the sides of the shell will produce considerable effect in driving out the air contained between the sides of the shell and casing.

What I claim as new is—

1. The revolving shell E, having a cam-shaped periphery for forcing air out of the case in which it revolves and having one or more peripheral openings and central air-inlets, in combination with an inclosing case provided with a suitable outlet, and means for giving motion to the shell, substantially as described.

2. In a blower, the combination, with a case having an outlet for discharging air, of a revolving shell, a hollow shaft revolving in bearings in the case and carrying the shell, and means for imparting motion to said shell, substantially as described.

3. The combination, with the case A, provided with a suitable outlet, of a shell, E, having a cam-shaped periphery and provided with one or more peripheral openings, in combination with two hollow shafts supporting the shell and revolving in bearings in the case, and suitable means for giving motion to the shell, substantially as described.

4. The case A and sides B, having bearings B', in combination with the hollow shafts C, the shell E, having a cam-shaped periphery, and provided with peripheral openings, and suitable means for imparting motion to the shafts and shell, substantially as described.

In testimony whereof I affix my signature in presence of two witnesses.

WILLIAM S. SHARPNECK.

Witnesses:
J. B. JONES,
MILTON J. STAIR.